US010573025B2

(12) United States Patent
Ciecko

(10) Patent No.: US 10,573,025 B2
(45) Date of Patent: Feb. 25, 2020

(54) METHOD AND SYSTEM FOR GENERATING INDOOR WAYFINDING INSTRUCTIONS

(71) Applicant: Brendan Ciecko, Boston, MA (US)

(72) Inventor: Brendan Ciecko, Boston, MA (US)

(73) Assignee: Cuseum, Inc., Boston, MA (US)

( * ) Notice: Subject to any disclaimer, the term of this patent is extended or adjusted under 35 U.S.C. 154(b) by 121 days.

(21) Appl. No.: 15/996,506

(22) Filed: Jun. 3, 2018

(65) Prior Publication Data

US 2019/0370998 A1 Dec. 5, 2019

(51) Int. Cl.
*G06K 9/00* (2006.01)
*G06T 7/73* (2017.01)
*G06T 7/246* (2017.01)
*G01C 21/20* (2006.01)

(52) U.S. Cl.
CPC .............. *G06T 7/74* (2017.01); *G01C 21/206* (2013.01); *G06K 9/00671* (2013.01); *G06T 7/248* (2017.01); *G06T 2207/30241* (2013.01)

(58) Field of Classification Search
CPC .. G06T 7/74; G06T 7/248; G06T 7/73; G06T 7/521; G06T 7/579; G06T 7/11; G06T 7/194; G06T 2207/30241; G06T 2207/30232; G06T 2207/10028; G06T 2207/30244; G01C 21/206; G01C 21/005; G01C 21/34; G01C 21/00; G01C 23/00; G06K 9/00671; G06K 9/00214; G06K 9/00664; G06K 9/2018; G06K 9/00476; G06K 9/00805; G06K 9/46; G06K 9/4604; G06K 9/6202; G06K 9/00691; G06K 2209/401; G06F 16/50; G06F 16/583; G06F 16/29; G06Q 10/087; G06Q 30/0633; H04N 7/181; A63F 13/92; G01S 17/89; G01S 3/7865; H04W 4/33; H04W 4/02; H04W 4/024
See application file for complete search history.

(56) References Cited

U.S. PATENT DOCUMENTS

| 8,818,706 | B1 * | 8/2014 | Ogale | G01C 21/206 |
| | | | | 340/539.1 |
| 9,462,423 | B1 * | 10/2016 | Rivlin | H04W 4/043 |
| 10,074,180 | B2 * | 9/2018 | Li | G06T 7/73 |
| 10,495,467 | B2 * | 12/2019 | Wang | G01C 21/206 |

(Continued)

OTHER PUBLICATIONS

Aoki, Hirashi et al., "Realtime Personal Positioning System for a Wearable Computers", MIT Media Laboratory, 1999, pp. 1-7. (Year: 1999).*

(Continued)

*Primary Examiner* — Jose L Couso
(74) *Attorney, Agent, or Firm* — Robert Schuler

(57) ABSTRACT

An indoor wayfinding application operates to generate pathway instructions based on knowledge about a mobile device user orientation, a starting location, a destination location and based upon knowledge of spatial inter-relationships and dimensions of enclosed spaces in a building. The user orientation is determined by an image comparison algorithm operating on a query image captured by a camera and a reference image, and the starting location is determined by comparing the query image to a plurality of reference images, each one of which is at a known location, for a best match.

18 Claims, 7 Drawing Sheets

MUSEUM 100

(56) References Cited

U.S. PATENT DOCUMENTS

| | | | | |
|---|---|---|---|---|
| 2008/0129825 | A1* | 6/2008 | DeAngelis | A63B 24/0021 |
| | | | | 348/169 |
| 2013/0212094 | A1* | 8/2013 | Naguib | G01C 21/206 |
| | | | | 707/730 |
| 2013/0230208 | A1* | 9/2013 | Gupta | G01C 21/206 |
| | | | | 382/103 |
| 2013/0288702 | A1* | 10/2013 | Abu-Alqumsan | H04W 4/025 |
| | | | | 455/456.1 |
| 2014/0198227 | A1* | 7/2014 | Mohammad Mirzaei | |
| | | | | G01C 21/12 |
| | | | | 348/208.2 |
| 2015/0350846 | A1* | 12/2015 | Chen | G01C 21/206 |
| | | | | 455/456.1 |
| 2018/0039276 | A1* | 2/2018 | Keivan | G05D 1/0246 |
| 2018/0061126 | A1* | 3/2018 | Huang | G01S 5/0263 |
| 2018/0349700 | A1* | 12/2018 | Percuoco | G06Q 10/00 |
| 2018/0350216 | A1* | 12/2018 | Satkin | G06T 7/579 |
| 2018/0373933 | A1* | 12/2018 | Ghinamo | G06T 7/75 |
| 2019/0020817 | A1* | 1/2019 | Shan | H04N 5/23238 |
| 2019/0102922 | A1* | 4/2019 | Gum | G01C 21/206 |
| 2019/0385328 | A1* | 12/2019 | Grosse-Kunstleve | |
| | | | | H04W 4/02 |

OTHER PUBLICATIONS

Li, Bing et al., "Vision-Based Mobile Indoor Assistive Navigation Aid for Blind People", IEEE Transactions of Mobile Computing, Vo.18, No. 3, Mar. 2019, pp. 702-714. (Year: 2019).*

* cited by examiner

FIG. 4A
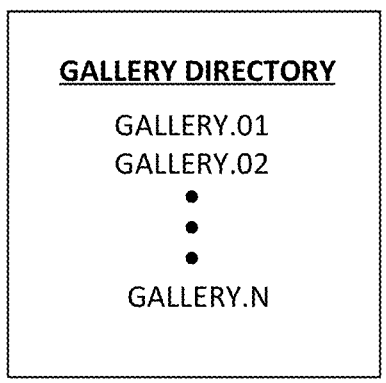
FIG. 4B
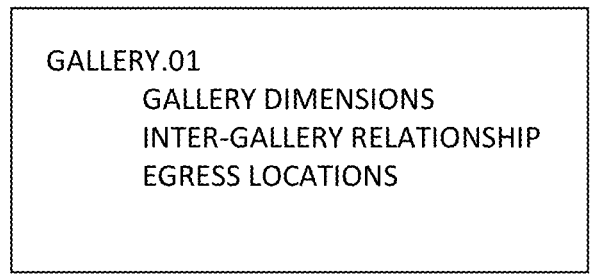
FIG. 4C
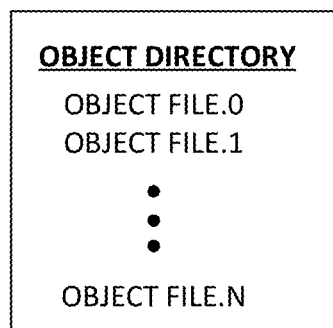
FIG. 4D
OBJECT FILE.0
VISUAL IMAGE INFO.
OBJ. IDENTITY (I.E. TITLE OF PAINTING/ARTIST NAME/ETC.)
LOCATION (GALLERY ID)
WALL LOCATION (WALL ID AND LOCATION ALONG WALL)

METHOD AND SYSTEM FOR GENERATING INDOOR WAYFINDING INSTRUCTIONS

1. FIELD OF THE INVENTION

The present disclosure relates to wayfinding based upon determining an initial position and orientation of an individual and specifically to indoor wayfinding.

2. BACKGROUND

Computer assisted methodologies for navigating from one location to another in either an indoor or outdoor environment are generally known as wayfinding, and these computer assisted methods are typically implemented in computer applications running on mobile communication devices. Wayfinding applications generally operate to detect a starting point, accept input from a user specifying a desired destination location that they would like to move to, and then provide guidance to the user that allows them to find their way to the specified destination location. This guidance can be displayed in the form of a virtual route superimposed on a floor plan or street map, the guidance can be in the form of turn by turn instructions based upon a current location of the use, or the guidance can be provided in the form of a virtual images of the interior of a building that correspond to the current position of the user and that shows the direction that the user should move.

Some indoor wayfinding applications can utilize wireless signals transmitted by fixed point transmitters such as beacons, WIFI routers or Bluetooth devices to determine a current position or starting point of a mobile device running the application, while other indoor wayfinding applications can rely upon a three-dimensional image map of the interior of a building, and then matching real-time images to mapped images to identify a current location of a user. Once the current location of the user is known, the application can generate directions for the user to follow to a destination.

3. BRIEF DESCRIPTION OF THE DRAWINGS

FIG. 4A is a diagram showing a listing of museum gallery files in a directory.

FIG. 4B is a diagram showing a data structure format for information maintained in a single gallery file.

FIG. 4C is a diagram showing a listing of object files in a directory.

FIG. 4D is a diagram showing a data structure format for information comprising an object file.

4. DETAILED DESCRIPTION

Figure 1A:
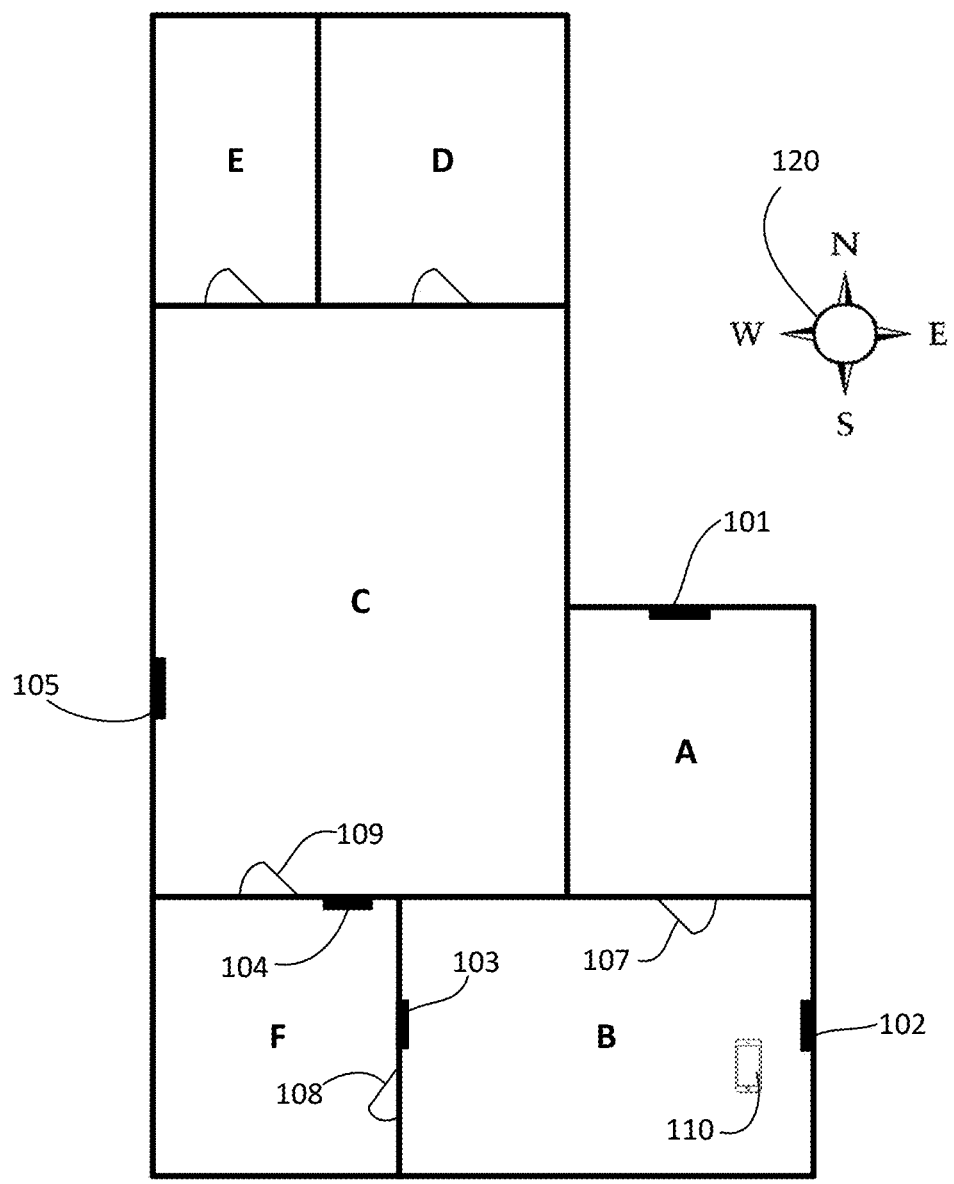
FIG. 1A is a diagram showing a museum 100 gallery layout with objects hung on gallery walls and egress labeled.

WIFI access points are widely used to implement indoor positioning system (IPS) infrastructure, as these access point devices are generally already deploying in indoor environment for wireless communication purposes. Also, Bluetooth Low Energy (BLE) beacons can also be install for the purpose of deploying an indoor positioning system network, as this is a cost effective means to implement an IPS network. However, the dependence by indoor wayfinding applications on signals generated by WIFI access points and beacons can be problematical as signals transmitted by these devices can change over time due to the equipment aging, due to environmental factors such as the addition of metal, and other wireless devices transmitting radio waves, not to mention the disruption to the signals caused by humans walking around in the environment. Also, maintaining an up-to-date beacon map can be challenging as the low cost of beacons can lead to periodically adding additional beacons to a network. Further, the accuracy of a starting position used by an indoor wayfinding application can be affected if different beacons in one area transmit signals with differing signal strengths. In some indoor environments, not being able to accurately determine a starting position can result in the wayfinding application generating a faulty starting point and a faulty path to a destination.

I have designed an improved wayfinding system that is able to consistently and accurately identify a current/starting position and mobile device orientation for use by a wayfinding application, without relying upon IPS methods or requiring the interior space of a building be mapped. My wayfinding system supports a wayfinding application that determines a starting position by identifying an object at a known location that is proximate to mobile communication device running the wayfinding application or which has access to the application running on a remote server, and then knowing a destination, the wayfinding application generates pathway instructions to be followed by a user of the wayfinding application from a starting location to a destination. Further, the wayfinding application uses object image information captured by a camera to determine a pose of the mobile device at the time the image is captured, and then uses the pose information to orient a user of the mobile device so that they are facing in a direction that allows them to start moving along a path towards the selected destination. My wayfinding application design does not rely upon interior floor plan information and does not rely upon any type of interior space mapping to accurately determine a starting point and to provide instructions for an application user to follow that leads them to the destination.

According to one embodiment, my wayfinding application uses spatial relationships between adjoining, enclosed spaces (i.e., adjoining galleries in a museum) and the locations of objects in the enclosed spaces to generate pathway instructions for the wayfinding application user to follow from a starting location to a destination location. The pathway instructions can be audio instructions, textual instructions or they can be visual instructions superimposed upon a real-time image displayed on the user's mobile device. The wayfinding application can run on any appropriate mobile communications device, such as a smart phone, a tablet computer, it can run on a wearable smart device, such as smart glasses, or it can run on a network server.

In the case that a starting location and a selected destination are in the small enclosed space, the instructions can be as simple as turn one hundred and eighty degrees and walk across the room to the opposite wall, or turn left and walk forty feet, and then turn right. On the other hand, if the starting and destination locations are in separate but adjoining spaces, the application can provide navigation instructions that lead them in toward and through a means of egress from the space they are in into the adjoining space, and then further directions to the destination once they have entered the adjoining space.

These and other implementations of my design are described with reference to the figures, in which FIG. 1A is an illustration of a museum 100 having a plurality of galleries, Galleries A-F, some, but not all of which are contiguous with each other and which have means of egress from one gallery space to another gallery space. Each space can be described as having certain dimensions, having one or more means of egress and the location of the egress, and having the identity and location of objects of art hanging on one or more walls comprising each enclosed space. The hanging objects can be pictures, and five pictures in FIG. 1A are labeled 101-105. A gallery, such as gallery B, can be described as having certain dimensions (25'×50' for example), having two means of egress labelled 107 and 108 (a doorway 107 on a north wall and a doorway 108 on an west wall), and having two paintings 102 and 103, with painting 102 hanging in the middle of a east wall and painting 103 hanging in the middle of a west wall. FIG. 1A also shows a mobile communications device 110 oriented with respect to the painting 102 in Gallery B and illustrating a compass icon 120 showing the direction of North (N), South (S), East (E) and West (W). The camera is illustrated as being oriented to the right of the painting by approximately forty-five degrees a particular distance from the painting.

Figure 1B:
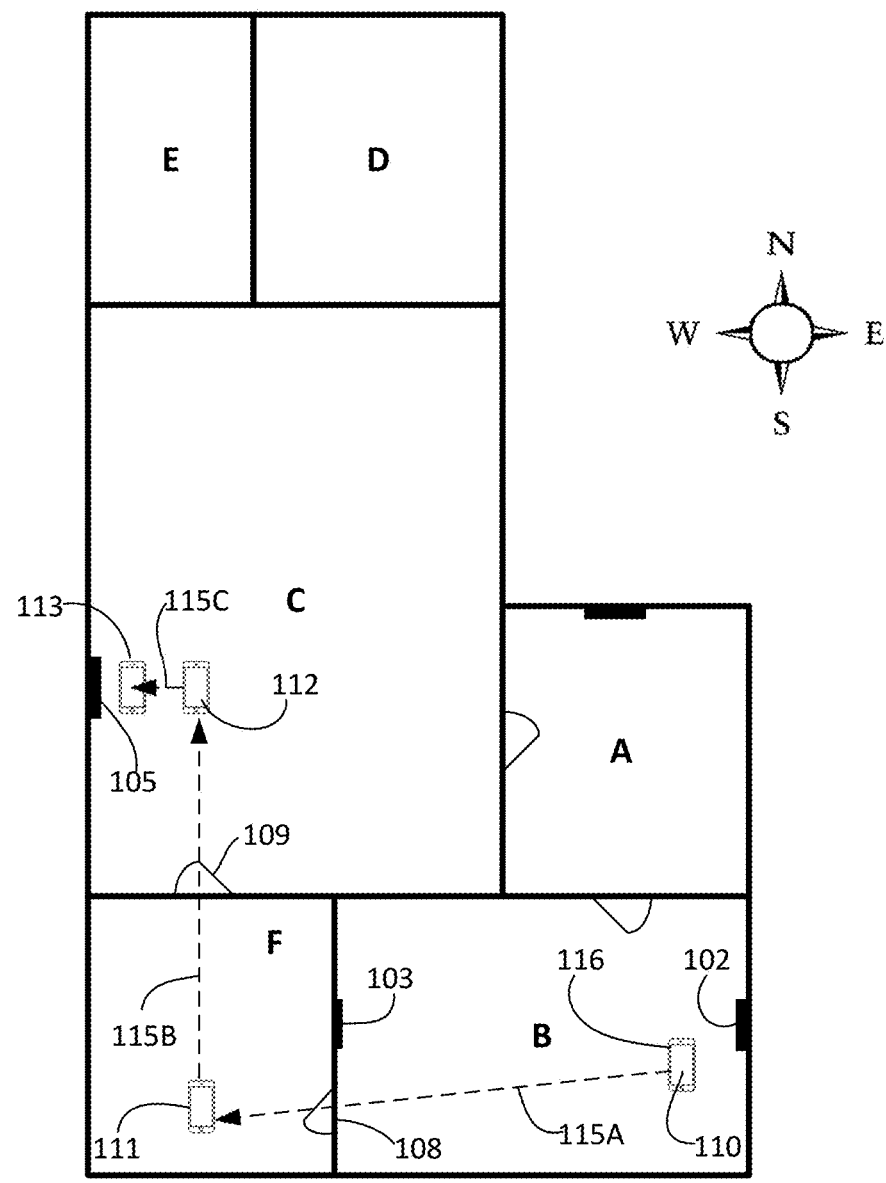
FIG. 1B is the same diagram as FIG. 1A and showing a pathway for a mobile device user to follow from a starting point to a destination.

FIG. 1B illustrates the same museum 100 galleries in the same spatial relationship to each other as shown in FIG. 1A, and it also illustrates a pathway 115 followed by a user of the mobile device from a starting location proximate to the object of art 102 hanging on the east wall of Gallery B, through Gallery F to a destination location proximate to the object of art 105 hanging on the west wall of Gallery C. Instructions used by the mobile device user are generated by the Wayfinding application without using any indoor positioning signals and without using a WIFI network. The pathway instructions between a starting and a selected destination location can be generated by the Wayfinding application using proximity and orientation of a mobile device with respect to an object of art and based upon spatial relationships between adjoining enclosed spaces, such as museum galleries, and the dimensions of the galleries. The destination location, such as object of art 105 can be selected from a listing of objects by the mobile device user, and once selected the Wayfinding application can generate and play the pathway instructions that the mobile device user can follow to the destination. The pathway 115 illustrated in FIG. 1B has three separate stages or sub-pathways, 115A, 115B and 115C, and each stage represents movement by the mobile device user in response to following pathway instructions generated by the Wayfinding application. An initial position in the pathway is labeled 116, two intermediate positions along the pathways are labeled 111 and 112, and a destination is labeled 113.

After the mobile device user selects a destination location (object 105 in this case) the Wayfinding application can generate and play one or more pathway instructions in a sequence of instructions (three instructions in this case) on a mobile device for the user to follow from a starting point (116 in the case of FIG. 1B) to a destination (113 in this case). For example, the instructions generated by the Wayfinding application can be as follows: (1) at starting location labeled 116, please turn left until oriented in a particular compass direction and walk through the door 108 located on the west wall of Gallery B and come to a stop after walking a distance of X feet, (2) turn right until oriented in a northerly direction and walk through the door 109 located on the north wall of Gallery F and come to a stop after walking a distance of Y feet, (3) turn left until oriented in a westerly direction and walk towards the west wall of Gallery C, which in this case is the destination 113 that coincides with the object 105.

Figure 1C:
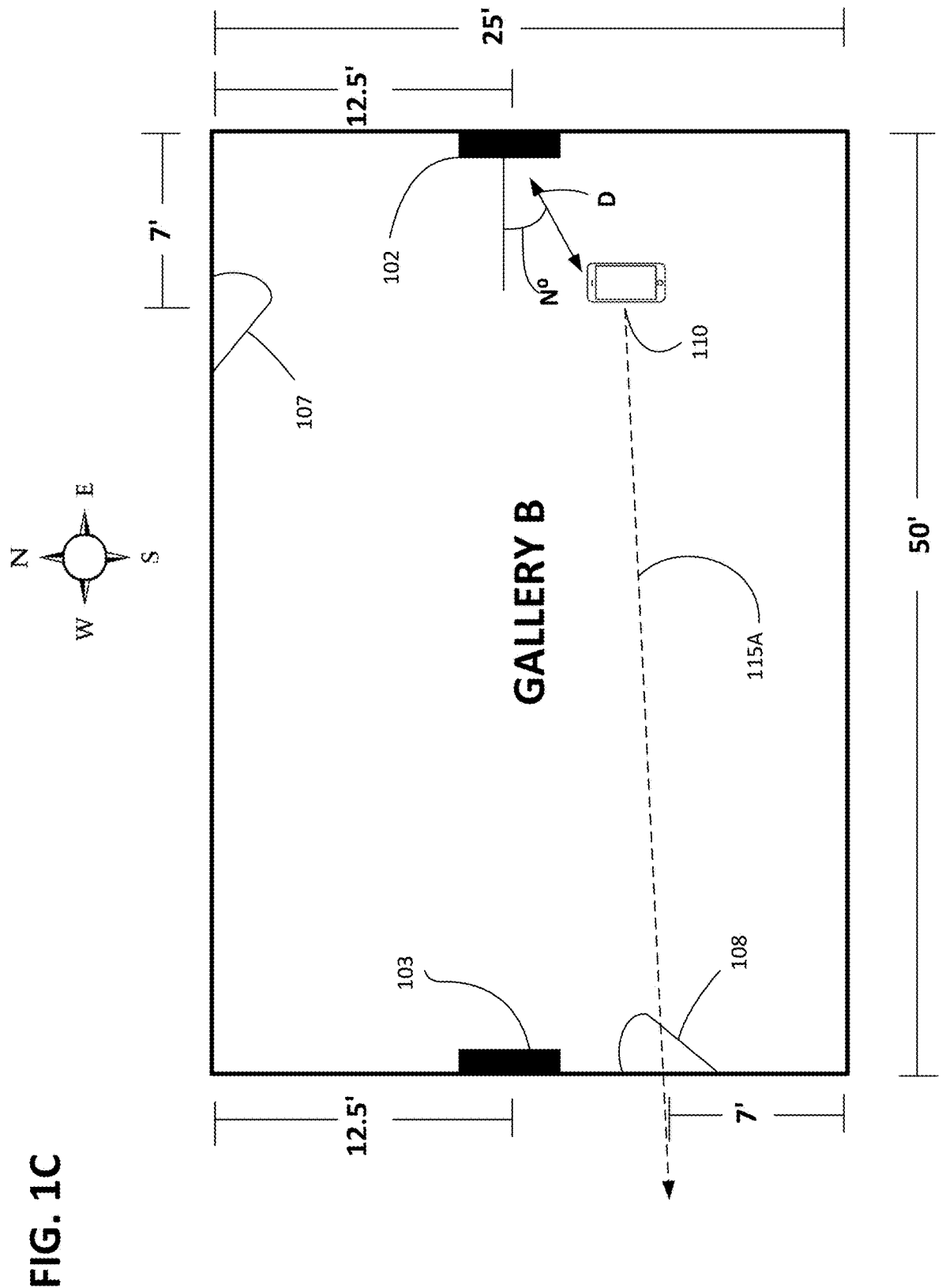
FIG. 1C is a diagram of a Gallery B illustrating an orientation of a mobile communication device 110 with respect to an object 102.

FIG. 1C illustrates the Gallery B of FIG. 1A in more detail showing wall dimensions, locations of pictures and egress means, and showing the mobile device 110 oriented at an angle X° to the right of the painting 102 and at a distance Y from the painting. The north and south walls of Gallery B are fifty feet in length, and the east and west walls are twenty-five feet in length. The center of door 107 is located on the north wall, seven feet from the north-east corner of Gallery B, and the center of door 108 is located on the west wall, seven feet from the south-west corner of Gallery B. Similarly, painting 102 is located on the east wall, twelve and one-half feet from the north-east corner of Gallery B, and the painting 103 is located on the west wall, twelve and one-half feet from the north-west corner of Gallery B. All of the gallery dimensions and inter-gallery relationship information, object display locations and gallery egress information can be maintained in a data structure format that is appropriate to an operating system running the mobile device and/or to the Wayfinding application running on the mobile device or the server, and these data structure formats maintained in mobile device or server memory are described in detail with reference to FIGS. 4A-4D.

Figure 2:
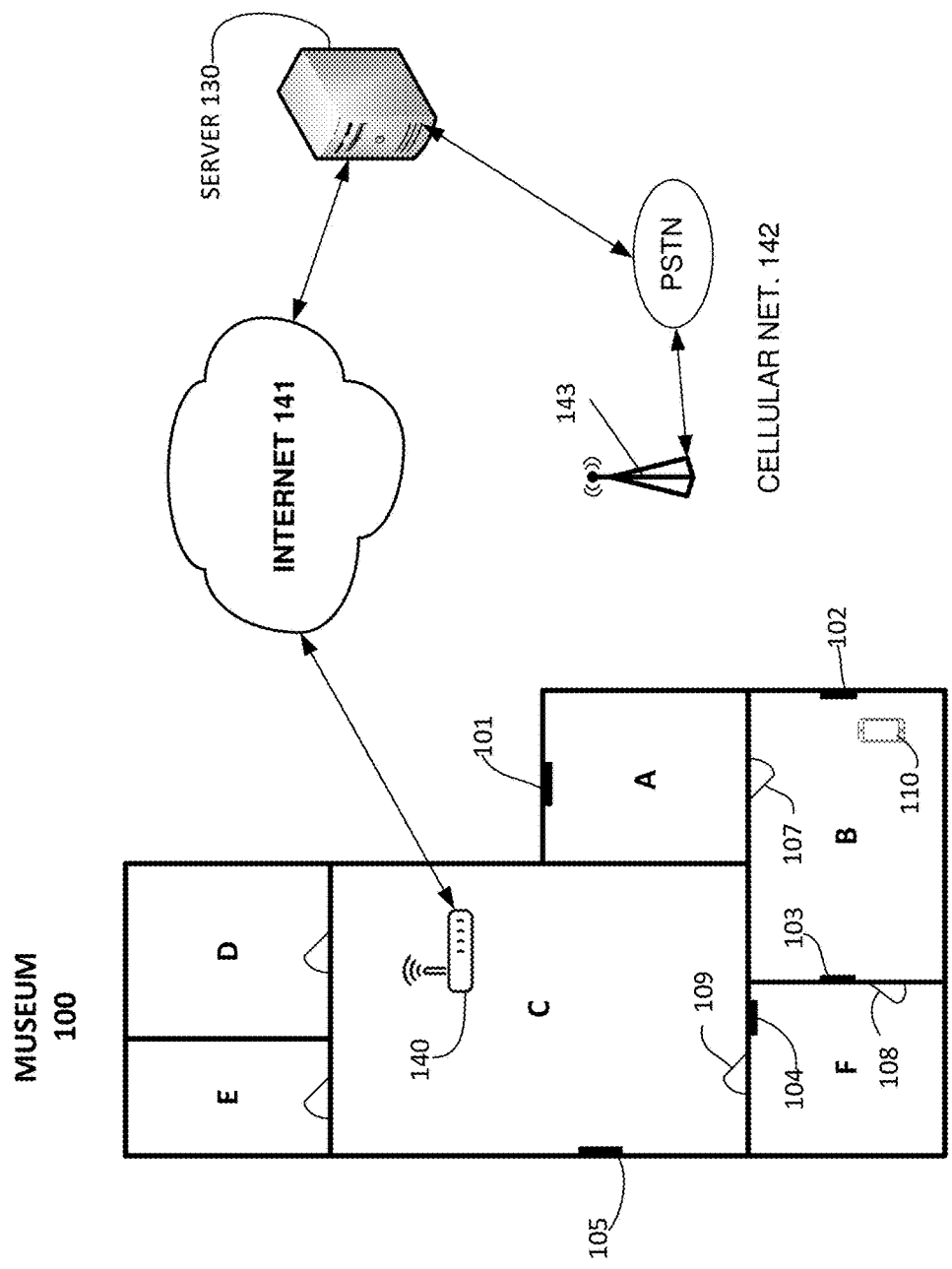
FIG. 2 is a diagram illustrating a wayfinding system 150.

FIG. 2 is a diagram of a Wayfinding system 150 comprising the mobile device 110, which may be running a client or full Wayfinding application, being in wireless communication via either a router 140 or cell tower 143 with a WAN such as the Internet 141 or PSTN respectively, both of which networks are in communication with a server 130, which can be configured to run the Wayfinding application.

Figure 3:
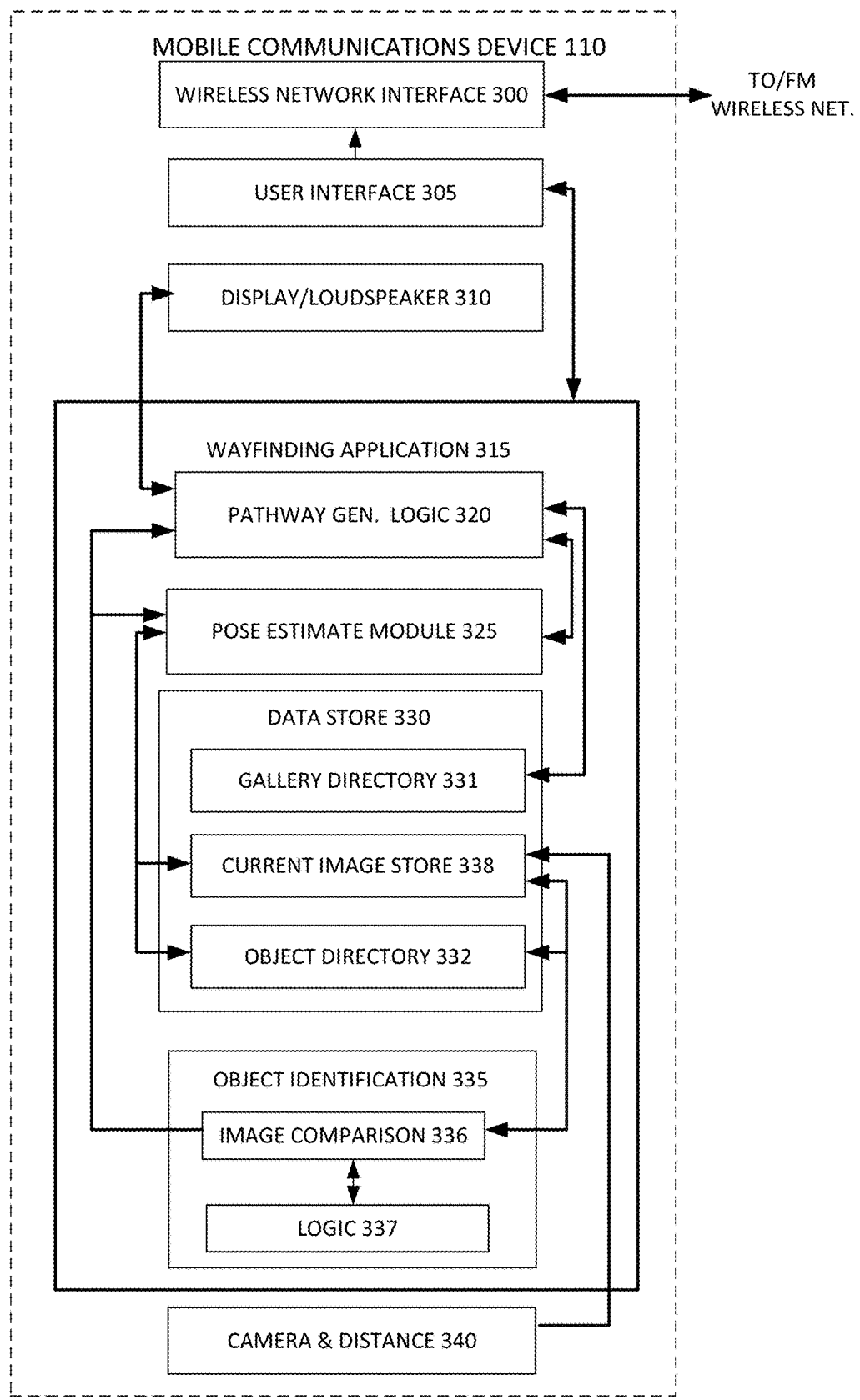
FIG. 3 is a diagram showing functional blocks comprising a mobile communications device 110.

Turning now to a FIG. 3 which shows functionality comprising the mobile communication device 110 that is configured to support the operation of the Wayfinding application. The Wayfinding application, labeled 315, is comprised of pathway generation logic 320, a pose estimation module 325, a data store 330 that can be any type of memory or disk device, an object identification module 335, digital camera and distance detection functionality 340 (functionality that is native to the mobile device 110) or some other means to digitally capture environmental images, a display and loud speaker that are commonly labelled display/loudspeaker 310, a user interface 305 that can be a keypad, touchpad or microphone, and wireless network interface functionality 300 that can be any type of appropriate transceiver module. Generally, the Wayfinding application 315 operates to determine a current location and orientation of the mobile device 110 based upon one or more environmental images (query images) captured by the camera 340 and a reference image stored in the directory 332, and it operates to receive destination information from a device 315 user all of which it uses to generate pathway instructions for the user to follow from a current location to a destination.

Continuing to refer to FIG. 3, the data store 330 maintains a gallery directory 331, an object directory 332 and a store of current image information 338. The gallery and object directories can be down-loaded into the store 330 from the server 130 shown with reference to FIG. 1D, and the current image store 338 maintains one or more images most recently captured by the camera 340. The gallery directory 331 is comprised of a plurality of files that maintain a listing of gallery identities in a museum, and other gallery specific information like gallery dimensions, inter-gallery spatial relationships, and gallery egress locations. The object directory is comprised of a listing of object identifies, visual image information representing each object, an identity of each object, and a location of each object in a gallery. The gallery directory and object directory are described in more detail with reference to FIGS. 4A, 4B, 4C and 4D.

The object identification module 335, shown with reference to FIG. 3, is comprised of an image comparison function 336 and comparison logic 337. The image comparison function can be any commercially available image comparison algorithm that operates to compare a query image (captured by the camera 340) with some or all of the reference images (maintained in the object directory 332) looking for a closest match. The comparison logic 337 operates to control the comparison function 336 to systematically and sequentially select a next object file having object image information to compare against a query image. Once the identity of the object most closely matching the current image is determined, the location of the object (gallery and wall locations) in the corresponding object file is looked-up, and this information (starting location) is sent to the pathway generation logic 320.

The pose estimate module 325 operates on current image information captured by the camera and the reference image information identified by the comparison function 336 to determine a current orientation (i.e., yaw) of the mobile device 110 (and therefore the mobile device user) with respect to the identified reference object. Optionally, the pose module can also receive distance information that it can use to more precisely determine the orientation and location of the mobile device user with respect to the identified object, and therefore more precisely determine the location of the user in a gallery in which they are currently located. The pose of a camera with respect to an object (i.e. a two-dimensional painting on a wall) can be determined in a number of different ways using a number of different tools and methods that are generally available. Machine vision applications are available that can run on mobile devices to compare reference shapes, such as a rectangular object, with a query image captured by the camera to determine dimensions, distances, angles, perspective/skew of the camera with respect to the two-dimensional object (represented by the query image) that it is proximate to. The camera pose information can then be made available to the pathway generation logic 320 to generate pathway instructions for the mobile device user to follow in order to move from a starting location to a destination. These instructions can be as simple as directing the user to turn to a particular compass setting and walk straight for a particular distance. Or a series of pathway instructions can be played for the user to follow from a starting position in one gallery to a destination in another gallery. The operation of the pathway logic 320 to generate pathway instructions will be describe later with reference to FIG. 5.

Continuing to refer to FIG. 3, the display or loudspeaker 310 operate to play the pathway instructions sent to them in the form of text information, audio information or graphical information. The user interface 305 can be used to initiate the Wayfinding application that allows the mobile device user to view object information maintained in the object directory to, for example, select a destination location that the user would like to move to, and it can be used to control the native functionality comprising the mobile device. It should be understood, that while the Wayfinding application 315 is described herein as being implemented in the mobile device and operating independently to generate wayfinding instructions, other configurations are possible. In other embodiments the mobile device can run a client application that interacts with a full application (i.e., the application having all of the functionality comprising the Wayfinding application 315) running on a server (such as the server 130 described with reference to FIG. 2) which also has the information comprising the data store 330. In this case, a camera image, distance information, and destination information accessed via the client and selected by the mobile device user can be sent to the server-side Wayfinding application which can use this information to generate wayfinding instructions that are sent to the mobile device to be played.

While either the mobile communication device 110 or the network server 130 can be configured to support the Wayfinding application 315 described above, some of the functionality comprising the application can be implement on the mobile device and some can be implemented on the server. For example, the object identification function 335, the pose estimate module 325, and the pathway generation logic can all be running on the server 130, or different functional configurations can be implemented as necessary depending upon capabilities of either the server or the mobile device Turning now to a description of the data structures that can be used to maintain the gallery and the object information. FIG. 4A illustrates the format of a data structure that can be used to maintain a listing of galleries, each gallery corresponding a file having information relating to gallery dimensions, inter-gallery relationships, and gallery egress locations, all of which information is shown with reference to FIG. 4B. Staring with Gallery B, and with reference to FIG. 1A, the inter-gallery relationship information can be maintained as follows: the west wall of Gallery B is contiguous with the east wall of Gallery F, the north wall of Gallery B is contiguous with the south wall of Gallery A and is contiguous with a portion of the south wall of Gallery C, and so forth. More information can be added for finer granularity, such as eighteen feet of the north wall of Gallery B is contiguous with eighteen feet of the south wall of Gallery C, or to add more definition, eighteen feet of the western portion of the north wall of Gallery B is contiguous with eighteen feet of the eastern portion of the southern wall of Gallery C. Other types of information can be used to define the inter-gallery relationships, each wall in a gallery can be assigned coded information that is unique to that wall. And the coded information can be assigned to different positions along the wall. So, for example, the north facing wall in Gallery B can be assigned a range of coded information starting in the north-west corner of the gallery. The coded information can be B.N.1-B.N.35 which translates to Gallery B, north wall positions that are one to thirty-five feet from the north-west corner of the gallery. This information can be used by the Wayfinding application to determine the next gallery a user enters provided they start at a known location and move in a particular direction for a particular distance.

The gallery dimension information maintained in the date structure in FIG. 4B can be used by the Wayfinding application in conjunction with the inter-gallery relationship information to generate one or more in a series of pathway instructions for the mobile device user to follow in moving from a current/initial position (i.e., proximate to the object 102) to a next location, whether the next location is a destination in the same space selected by the user or a location in another space that is along the pathway to the destination. These pathway instructions can be easily generated knowing gallery dimensions and a current/starting location of the mobile device. Generating precise movement distance instructions is not always important for this Wayfinding application to be useful, as the distances can vary depending upon the location of a doorway and the precision and/or the methodology with which the current/starting location of the mobile device user is calculated. Regardless, when moving through crowded, indoor spaces with a plurality of objects, each space having multiple means of egress to multiple other spaces, it can be difficult for someone to easily determine how to proceed to a desired destination, and even general directional and distance instructions can be invaluable in these cases.

FIG. 4C and 4D illustrate respectively an object directory that lists some or all of the objects of art currently on display in the galleries and a data structure format that can be used to maintain the information corresponding to object image information, object identification information, the identity of a gallery in which the object is located, and a location of an object on a gallery wall. The objects in this case can be objects of art that are hanging on gallery walls or they can be free standing objects, such as sculptural pieces, that are located along the walls or in known positions on a gallery floor.

Figure 5:
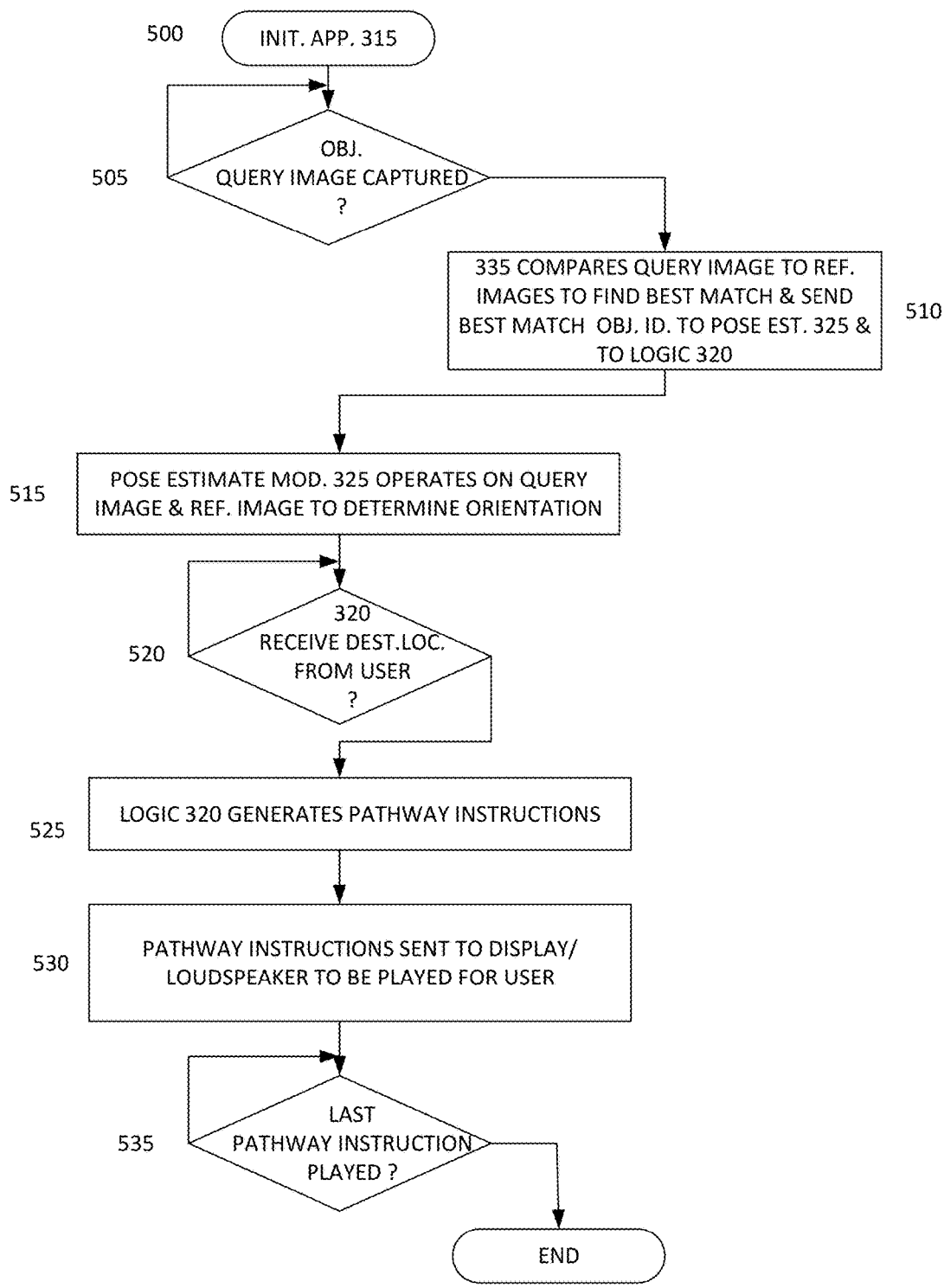
FIG. 5 is a logical flow diagram illustrating the generation of pathway instructions.

FIG. 5 is a logical flow diagram showing the operation of the application 315 to generate pathway instructions. Subsequent to the Wayfinding application 315 being initialized by the mobile device user, the image comparison function 336 at 505 is controlled by the logic 337 to periodically examine the current image store 338 for one or more newly captured query images of an object, which according to one embodiment is an image of a work of art such as a painting that is hanging on a gallery wall. In the event that the comparison function detects a newly captured query image (as determined by a time-stamp assigned to each image in comparison to a clock running on the mobile device for example), the function at 510 is controlled to compare the query image captured at 505 to some or all of the reference images in each of the object files maintained in the object directory 332 until a best match is identified. The identity of the object associated with the reference image identified at 510 is then sent to the pose estimate module at 515 and to the pathway generation logic 320. After receiving the identify of the reference image object, the pose module 325 operates to retrieve the query image information from the store 338 and to retrieve the identified reference object image information in the corresponding object file maintained in the directory 332 and uses this information to determine an orientation of the mobile communication device 110 with respect to the reference image information (i.e., a painting hanging on a gallery wall). This orientation can be for example that the mobile device user is standing directly in front of the painting (i.e., orientation=zero degrees), or that the user is standing off to the side at an angle of forty-five degrees, and this orientation is generally illustrated with reference to FIG. 1B. Subsequent to determining the pose of the user, at 520 if the pathway generation logic 320 determines that the user has entered a destination location into the application 315, then at 525 it proceeds to generate one or a series of pathway instructions for display on the mobile device. More specifically, the logic 320 examines the reference object file identified at 510 for the location of the reference object (i.e., gallery identity and object location on gallery wall), it then uses the gallery identity to lookup the gallery dimensions and interdependency information, and it examines the pose estimate module 325 for the user orientation and generates one or more pathway instructions for the user to follow. Knowing the orientation angle and distance from the user to the painting, the logic 320 can employ a trigonometric function (sine function to calculate adjacent side of right triangle) to accurately calculate a distance between the wall the painting is hanging on and the user.

According to one embodiment, and assuming that the destination selected by the user is located in the gallery the user is currently located, the pathway generation logic can generate instructions advising the user how to orient themselves, how far and in what direction to move to arrive at the selected destination provided it knows the location of the destination (i.e., painting hanging on gallery wall), knows the location and orientation of the user in the gallery, and knows the gallery dimensions.

According to another embodiment, and assuming that the selected destination is in a gallery other than the one the user is currently located, the pathway generation logic can generate a series of instructions advising the user how to orient themselves, how far and in what directions the user should move to arrive at the selected destination provided it knows the location of the destination (i.e., painting hanging on destination gallery wall), knows the location and orientation of the user in the current gallery, knows the inter-gallery relationships knows the gallery dimensions and the locations of egress means in each gallery. These pathway instructions are displayed on the mobile device 110 in the form of textual instructions, audio instructions, visual instructions, or some combination thereof. If at 535 the logic 320 determines that all pathway instructions have been played, then the process comes to an end, otherwise the logic causes the next instruction to be played.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method of generating an interior pathway instruction, comprising:
   identifying a current location of a mobile communications device user with respect to an enclosed interior space by:
      controlling a mobile communications device to capture a query image of an object proximate to the mobile communication device;
      comparing the query image to each one of a plurality of reference images, each one of which corresponds to an object at a known location in the enclosed interior space and which are stored on the mobile communication device;
         wherein the known location of each object is not determined by an indoor positioning system; and
      determining that there is a match between the query image and at least one of the plurality of the reference images and temporarily storing information that is indicative of the known location of the object;

determining an orientation of the mobile communication device with respect to the object by comparing the query image to the matching reference image; and using the known location of the object, the orientation of the mobile communication device, a destination location selected by a mobile communication device user and enclosed interior space information to generate an interior pathway instruction that is played by the mobile communication device to guide the mobile communication device user to reorient themselves and to move away from a current location in a first direction towards the destination location.

2. The method of claim 1, wherein the current location of the mobile communication device is a same or different enclosed interior space than the destination location.

3. The method of claim 1, further comprising using enclosed interior space egress location information when generating pathway instructions if the destination location is in an enclosed interior space that is different than the current location of the mobile communication device.

4. The method of claim 3 wherein two or more interior pathway instructions are generated if the destination location is in a different enclosed interior space than the current location of the mobile communication device.

5. The method of claim 1, wherein the enclosed interior space is a museum gallery.

6. The method of claim 1, wherein each enclosed interior space corresponds to a single museum gallery file that is comprised of gallery dimensions, inter-gallery spatial relationship information and egress locations.

7. The method of claim 6, wherein the inter-gallery spatial relationship information is information indicative of walls that are common to two or more galleries.

8. The method of claim 1, wherein each one of the plurality of the reference images is stored in a different object file that also has an object identity, a gallery identity, and a gallery location identity.

9. The method of claim 1, further comprising the mobile communication device maintaining the plurality of the reference Images and running a computer application comprising logical instructions stored in a non-volatile computer readable medium that operates to match the query image to one of the plurality of the reference images to determine a current location of the mobile communications device, and that operates to determine an orientation of the mobile communications device with respect to one of the reference images, and uses the known location of the object, the orientation of the mobile communication device, a destination location selected by a mobile communication device user and enclosed interior space information to generate an interior pathway instruction that the mobile communication device plays to guide the user to reorient themselves and to move away from the current location in the first direction towards the destination location.

10. The method of claim 1, further comprising a computational device connected to a network that maintains the plurality of the reference Images and which runs a computer application comprising logical instructions stored in a non-volatile computer readable medium that operates to match a query image sent to it by the mobile communication device with one of the plurality of the reference images to determine a current location of the mobile communications device, and that operates to determine an orientation of the mobile communications device with respect to one of the reference images, and uses the known location of the object, the orientation of the mobile communication device, a received destination location selected by a mobile communication device user and enclosed interior space information to generate an interior pathway instruction that is send to the mobile communication device to guide the user to reorient themselves and to move away from the current location in the first direction towards the destination location.

11. A system for generating an interior pathway instruction, comprising:

a mobile communication device connected over a wireless communication network to a remote computational device, the remote computational device maintaining a plurality of reference images in an associated storage device each one of which reference images correspond to an object at a known location in an enclosed interior space;

wherein the known location of each object is not determined by an indoor position system; and a computer application running on either the mobile communication device or the remote computational device and which is comprised of logical instructions stored in a non-volatile computer readable medium that operate to:

determine a current location of the mobile communication device by identifying a query image that most closely matches a reference image and to temporarily store information that is indicative of a known location of the corresponding object;

determine a current orientation of a mobile device user with respect to the object by comparing the query image to the matching reference image; and the computer application operating on the current location, current orientation, enclosed interior space information, and a destination location selected by a mobile communication device user to generate a pathway instruction that is played by the mobile communication device to guide the mobile communication device user to reorient themselves and to start moving away in a direction towards the destination location selected by the user.

12. The method of claim 11, wherein the current location of the mobile communication device is in a same or a different enclosed interior space than the destination location.

13. The method of claim 11, further comprising using enclosed interior space egress location information when generating pathway instructions if the destination location is in an enclosed interior space that is different than an enclosed interior space in which the mobile communication device is currently located.

14. The method of claim 13 wherein two or more interior pathway instructions are generated if the destination location is in a different enclosed interior space than the current location.

15. The method of claim 11, wherein the enclosed interior space is a museum gallery.

16. The method of claim 11, wherein each enclosed interior space corresponds to a single museum gallery file that is comprised of gallery dimensions, inter-gallery spatial relationship information and egress locations.

17. The method of claim 16, wherein the inter-gallery spatial relationship information is information indicative of gallery walls that are common to two or more galleries.

18. The method of claim 11, wherein each one of the plurality of the reference images is stored in a different object file that is also has an object identity, a gallery identity, and a gallery location identity.

\* \* \* \* \*